United States Patent
Kwatra et al.

(10) Patent No.: US 11,556,335 B1
(45) Date of Patent: Jan. 17, 2023

(54) ANNOTATING PROGRAM CODE

(71) Applicant: International Business Machines Corporation, Armonk, NY (US)

(72) Inventors: Shikhar Kwatra, San Jose, CA (US); Nadiya Kochura, Bolton, MA (US); Indervir Singh Banipal, Austin, TX (US); Sourav Mazumder, Contra Costa, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/474,612

(22) Filed: Sep. 14, 2021

(51) Int. Cl.
*G06F 8/73* (2018.01)
*G06F 8/71* (2018.01)

(52) U.S. Cl.
CPC . *G06F 8/73* (2013.01); *G06F 8/71* (2013.01)

(58) Field of Classification Search
CPC ..................................... G06F 8/73; G06F 8/71
USPC ......................................................... 717/123
See application file for complete search history.

(56) References Cited

U.S. PATENT DOCUMENTS

| | | | |
|---|---|---|---|
| 8,418,130 B2 | 4/2013 | Tittizer | |
| 9,201,646 B2 | 12/2015 | Balachandran | |
| 9,372,689 B2 | 6/2016 | Frenkiel | |
| 9,563,408 B1 | 2/2017 | Bartlett | |
| 10,289,963 B2 | 5/2019 | Chiticariu | |
| 10,885,392 B2 | 1/2021 | Znamenskiy | |
| 2013/0204833 A1 | 8/2013 | Pang | |
| 2019/0050731 A1 | 2/2019 | Lu | |
| 2020/0412682 A1 | 12/2020 | Trim | |

FOREIGN PATENT DOCUMENTS

| | | |
|---|---|---|
| CN | 106021410 A | 10/2016 |
| CN | 106681708 A | 5/2017 |
| EP | 0650126 A1 | 4/1995 |

OTHER PUBLICATIONS

Breazeal, Apparatus and Methods for Providing a Persistent Companion Device, 2017, AU.*
"Automatically Generating Comments for Arbitrary Source Code", © Copyright 2021 Two Six Technologies, <https://www.twosixlabs.com/automatically-generating-comments-for-arbitrary-source-code/>.
"CoolDOC—Automatic source code documentation generator for object-oriented languages", Copyright © East-West Design & Test 2005-2021, 1 pp., <https://www.ewdtest.com/cooldoc-automatic-source-code-documentation-generator-for-object-oriented-languages/>.
"Microsoft to acquire GitHub for $7.5 billion", Jun. 4, 2018, Microsoft News Center, 4 pps., <https://news.microsoft.com/2018/06/04/microsoft-to-acquire-github-for-7-5-billion/>.
Hu et al., "Deep Code Comment Generation", 11 pps., ICPC'18, May 27-May 28, 2018, Gothenburg, Sweden, © 2018 Association for Computing Machiner, <https://xin-xia.github.io/publication/icpc182.pdf>.

(Continued)

*Primary Examiner* — John Q Chavis
(74) *Attorney, Agent, or Firm* — David K. Mattheis; Maeve Carpenter

(57) ABSTRACT

Annotating programming code by receiving a first version of programming code, determining annotations for the code according to a first machine learning model, identifying a user, altering a generative model according a persona of the user, and generating altered annotations using the altered generative model.

20 Claims, 4 Drawing Sheets

(56) References Cited

OTHER PUBLICATIONS

Liang et al., "Automatic Generation of Text Descriptive Comments for Code Blocks", 11 pps., arXiv:1808.06880v1 [cs.AI], Aug. 21, 2018.
Mell et al., "The NIST Definition of Cloud Computing", National Institute of Standards and Technology, U.S. Department of Commerce, NIST Special Publication 800-145, Sep. 2011, 7 pages.
Resende, "IBM announces Elyra AI Toolkit, a set of AI-centric extensions to Jupyter Notebooks" BM, Published Apr. 29, 2020, <https://developer.ibm.com/technologies/artificial-intelligence/blogs/open-source-elyra-ai-toolkit-simplifies-data-model-development/>.
Urooj, "https://www.edureka.co/blog/top-10-ides-for-web-development/", Published on May 14, 2020, edureka!, 9 pps., <https://www.edureka.co/blog/top-10-ides-for-web-development/>.

* cited by examiner

ANNOTATING PROGRAM CODE

FIELD OF THE INVENTION

The disclosure relates generally to the machine learning-based generation of program code annotations. The disclosure relates particularly to machine learning-based generation of program code annotations according to user attributes.

BACKGROUND

Computer program developers, such as Data Scientists/Architects, Software Engineers, spend hours writing piece of code, using different algorithms and documenting their codes/scripts, processes, through the addition of explanatory comments and other annotations.

Machine learning approaches to generating descriptive comments for code provide generalized comments based upon the structure of the code and specified comment rule sets.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the generation of personalized programming code annotations.

Aspects of the invention disclose methods, systems and computer readable media associated with annotating programming code by receiving a first version of programming code, determining annotations for the code according to a first machine learning model, identifying a user, altering a generative model according a persona of the user, and generating altered annotations using the altered generative model.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
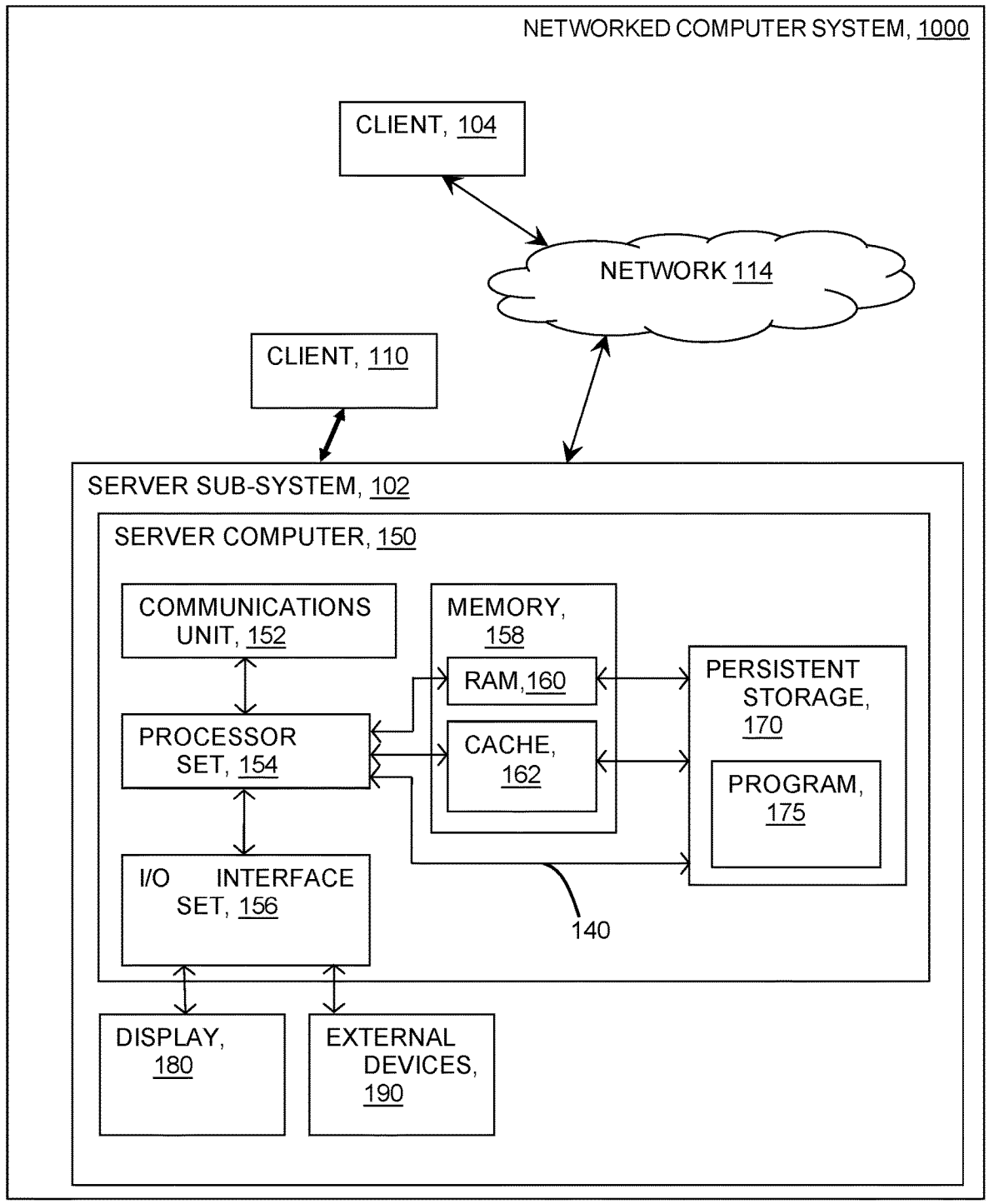
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

As used herein, a user's paradigm refers to classifications of a programming language and associated data structures with which a user may have familiarity and a determinable level of expertise. Exemplary classifications include imperative, such as procedural or object-oriented, declarative, such as functional, logic, mathematical, or reactive, and symbolic classifications.

Data Scientists or Data Engineers might tend to lean more towards a Functional Programming paradigm. Software Engineers/Backend Engineers might have a tendency toward an Imperative Programming Paradigm. The disclosed systems and methods understand the past comments from different personas, or future feedback, and improve the comment generation based on current personas and the target audience.

Automatically generating code annotations using machine learning models based upon code structures results in generalized annotations for the code. Such annotations are not directed toward specific users or audience groups and may not provide sufficient information to satisfy particular audience groups. Disclose embodiments generate custom annotations according to unique personas associated with individual users or user groups. Disclosed methods tailor generalized annotations to meet the needs of particular user and user groups based upon user feedback regarding the annotations and user authored code examples.

Aspects of the present invention relate generally to code annotation systems and more particularly to the unsupervised generation of tailored code annotations based upon user personas. In embodiments, an annotation generating system receives user login credentials and profiles the user through crowdsourced portals. The user profile includes data relating coding paradigms familiar to the user together with a level of user familiarity with each paradigm and confidence scores for each of the paradigms and level of paradigm familiarity. Keywords associated with a user's code usage role, e.g., retrieve code sample, review code, debugging code, etc., are extracted and added to a user's profile defining the user's role. According to aspects of the invention, the annotation system extracts knowledge proficiency tests for each identified paradigm and fetches related data for each test. User comments are evaluated using natural language understanding algorithms to extract a user style for the user's profile. The system adjusts the user's profile and paradigm scoring according to the extracted tests and data. Information extracted from user provided code is passed to a knowledge distillation generative adversarial network (KD-GAN) model. The KD-GAN model generates code annotations according to the constraints reflected in the user's persons and the information extracted from the code sample. In this manner, implementations of the invention learn and continually adjust a user's profile and associated persona such that the annotation system returns code annotations appropriate for each system user regardless of the code author.

In accordance with aspects of the invention there is a method for automatically adjusting confidence thresholds associated with user code paradigm s and paradigm level of familiarity to generate annotation tailored to the user knowledge and experience, the method includes: receiving a user's identity—login credentials, selecting confidence thresholds for a particular language familiar to the user and user level of familiarity with that language; processing iteratively portions of a proficiency test associated with the language using crowdsourced data, and adjusting the scores associated with the language familiarity and level of familiarity for the user according to the proficiency testing outputs. Disclosed methods adjust generative models according to changes in the user attributes and use the generative model to alter generalized annotations associated with user provided code samples. In this manner, disclosed methods generate code annotations tailored to the role of the user as well as specifically tailored to the personal ability levels and experience of each user.

Aspects of the invention provide an improvement in the technical field of code annotation systems. Conventional code annotation systems utilize static (i.e., unchanging) machine learning models in generating code annotations, yielding generalized annotations lacking tailoring for specific user and roles. In many cases, the generated annotation lack specific details desired by individual users. As a result, the models produce annotations of little value to many users. In some cases, however, users benefit from annotations tailored to their specific experience and knowledge levels. Implementations of the invention leverage user profiles which are continually modified to remain current with respect to user knowledge and ability. This provides the improvement of generating code annotations specific to each user while at the same time avoiding the disadvantages associated with a static confidence threshold.

Aspects of the invention also provide an improvement to computer functionality. In particular, implementations of the invention are directed to a specific improvement to the way code annotation systems operate, embodied in the continually adjusted user knowledge/ability/style persona used to tailor the code annotation generative model for each user. In embodiments, the system adjusts the generative model each time code is presented for annotation, such that the generative model used to create annotations for the current code sample differs from the generative model used to create annotations for this user for the previously presented code sample. As a result of adjusting the user persona and generative model according to user data and user provided feedback associated with previously generated code annotations, the system increases or decreases the likelihood that the system will provide useful code annotations for the user for the current and next code samples. In this manner, embodiments of the invention affect how the code annotation system functions (i.e., the likelihood of providing beneficial code annotations for each code sample provided).

As an overview, a code annotation system is an artificial intelligence application executed on data processing hardware that generates comments or annotations relating to programming code samples or snippets. The code annotation system receives inputs from various sources including input over a network, a corpus of electronic documents or other data, data from a content creator, information from one or more content users, and other such inputs from other possible sources of input. Data storage devices store the corpus of data. A content creator creates annotations in provided code for use as part of documenting and explaining the code sample.

In an embodiment, one or more components of the system can employ hardware and/or software to solve problems that are highly technical in nature (e.g., receiving code samples, generating annotations of the code sample, altering a generative model according to a user's persona, generating altered annotations according to the user's person, evaluating and altering user personas as needed, etc.). These solutions are not abstract and cannot be performed as a set of mental acts by a human due to the processing capabilities needed to facilitate automated generation of tailored code annotations. Further, some of the processes performed may be performed by a specialized computer for carrying out defined tasks related to generating code annotations. For example, a specialized computer can be employed to carry out tasks related to generating personalized code annotations for each system user, or the like.

In an embodiment, a user engages the code annotation systems and method for the purpose of automatically providing annotations to code snippets to provide explanatory comments and other documentation to their code. In this embodiment, the user logs in to the system by providing their user identification and other login credentials, such as a password. The system receives the user id and credentials and uses the information to retrieve a current persona stored for the user. In an embodiment, the system stores user persona data using cloud resources. For a new user, the system receives the user id and credential and creates a new user persona for that user, stating the user id and credentials as part of the newly created user persona. The user may opt in t having their information used to fetch relevant user information from crowdsourced user portals, such as using data scraping tools such as the PYTHON BEAUTIFULSOUP library of tools. (Note: the terms "PYTHON", and "BEAUTIFULSOUP" may be subject to trademark rights in various jurisdictions throughout the world and are used here only in reference to the products or services properly denominated by the marks to the extent that such trademark rights may exist.)

In an embodiment, the classification model of the system and method analyzes the scraped data for keywords such as Architect, Business analyst, Data Scientist, C-suite category, Project Manager, Software engineer etc. as indications of the paradigms with which the user is familiar. The model is further trained to extract keywords and entities from the scraped data associated with the user's purpose for viewing/providing the current code sample, such as to understand the design/architecture, to get sample code, for code review, for debugging the code for troubleshooting purposes, etc. The system defines an initial role for the user/persona based upon permissions set for different users and skills having similar keyword and entity data. A first machine learning classification model, such as a Deep learning neural network model, or similar, receives the extracted keywords and entities from the scraped user data and outputs a classification and confidence level for the classification of the user for storage as part of the user's persona and profile.

In an embodiment, the method applies proficiency tests to the scraped data to classify the familiarity and level of familiarity of the user with various paradigms indicated in the scraped user data. For application to the proficiency tests, scraped data for each programming language under consideration as a part of a paradigm evaluation includes code commits, types of code commits, frequency of code commits done, etc.

In an embodiment, the method uses natural language processing (NLP) and natural language understanding (NLU) algorithms to extract the keywords and entities from the scraped user data. Sentiment analysis of extracted values provides an input form ranking the extracted entities.

Disclosed embodiments can perform natural language processing for extraction of NLP output parameter values from received profile data for a user, as well as response data from the user regarding annotation system output. NLP includes performing one or more of a entity/topic classification process that determines topics of messages and outputs one or more topic NLP output parameter value, a sentiment analysis process which determines sentiment parameter value for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameter values, e.g., one of more "social tendency" NLP output parameter or one or more "writing style" NLP output parameter, and/or one or more part of speech NLP output parameter value. Part-of-speech tagging methodologies can include use of, e.g., Constraint Grammar, Brill tagger, Baum-Welch algorithm (the forward-backward algorithm) and the Viterbi algorithm which can employ use of the Hidden Markov models. Hidden Markov models can be implemented using the Viterbi algorithm. The Brill tagger can learn a set of rule patterns, and can apply those patterns rather than optimizing a statistical quantity. Applying natural language processing can also include performing sentence segmentation which can include determining where a sentence ends, including, e.g., searching for periods, while accounting for periods that designate abbreviations.

For each extracted entity, the method utilizes the NLP/NLU outputs to define a feature vector for the entity. The method then compares and ranks the entity feature vectors yielding an overall ranking of all entity feature vectors for the user's profile/persona data. The ranking serves as an input to scoring the level of proficiency and familiarity of each user with each considered programming language. In an embodiment, the method collects each persona's textual metadata about programming and commits and adds the collected metadata to the NLP pipeline for feature generation and entity processing. The workflow of the method produces the ranking of entities indicating relative familiarity and proficiency with each entity. The highest ranked entity being the preferred language for the user.

In an embodiment, the method determines similarities between entity feature vectors and user paradigm feature vectors using known methods for determining vector similarities or distances between vectors. The method ranks feature vectors according to relative distances between such vectors and user paradigm feature vectors.

In an embodiment, the method utilizes the relative rankings of the user's language paradigm in generating comments for a user. In this embodiment, the method generates comments through the lens of the user's highest ranked or preferred language, easing the user's path to understanding and utilizing the content of the generated comment. As an example, the method generates comments using a relevant example explanation according to the user's preferred language, regardless of the language of the sample code snippet. For a user having Python as their preferred language paradigm, the method generates comments using examples from Python relevant to the provided code sample.

In an embodiment, for each interaction with the user, the method checks for additional crowdsourced user data to update the user persona. Updated data is processed, and persona data related to user paradigm familiarity, level of familiarity and associated confidence scores are either changed or remain static. The resulting scores are normalized for ranking across all user persona paradigms.

In an embodiment, the method uses NLU algorithms to identify entities in the data, define feature vectors for each entity, score each entity according to the defined feature vectors and rank the scored entities according to the scores. The method generates a knowledge distillation model or knowledge graph consisting of nodes (entities) and edges between the nodes. In this embodiment, the edges represent relationships between entities. The generated model represents the persona of the user in terms of the extracted, scored and ranked entities and language paradigms for that user.

In an embodiment, user comments are extracted from the scraped data and processed. The classifications associated with the comments are appended to the NLU classifier as possible classification states for future data. In an embodiment, the method stores such classification states in dictionary format in a database, such as a json dictionary format in a cloud database.

In an embodiment, the method passes code samples provided for annotation by the user, or extracted from scraped data using NLU, to a generative adversarial network (GAN) as input for the generation of annotations. In an embodiment, the GAN receives representations of the inputs data from an autoencoder configured to process the code data. In this embodiment, the GAN generates generalized annotations for the code. Such annotations lack any specific tailoring for a particular user or user group.

In an embodiment, the method augments the GAN by fusing it with the knowledge graph derived from the processed user persona data. In this embodiment, the altered GAN (the KD-GAN) receives sentence representations from the autoencoder associated with the code samples, or the originally generated annotations for the code samples, and generates ne, altered annotations of the code samples. The altered annotations reflect the NLU outputs for the code samples as well as the knowledge graph outputs for the user.

As an example, a user accesses the system, providing their identification and credentials to do so. The system authenticates the user and extracts the current dictionary format persona/profile for the user from the cloud database. With the user's consent, the method scrapes any new data associated with the user's online profile and appends the new data to the json databases dictionary entry for the user. The method appends user role information in the stored persona. After updating the user's persona, the method alters the KD-GAN using the updated persona data as input to customize the KD-GAN model according to the writing style, user familiarity, role, and expertise data contained in the persona data of the user.

In an embodiment, a TLB (translation lookaside buffer) table entry is created in a hashmap to encode the persona to the dialog that needs to be generated by the model. Further, in order to morph the static dialogues generated using the unaltered GAN, the persona information is then provided to the KD-GAN, altered with a constraint function, to provide detailed comments if needed based on the persona.

In this embodiment, the method then processes the user's code sample and passes an autoencoder generated representation of the sample to the altered KD-GAN, together with the appended persona data, as input parameters. The altered KD-GAN generates annotations for the code. customized for the user. The system presents the code sample with annotations to the user. In this embodiment, the user may update the code sample and/or provide feedback to the system regarding the generated annotations. The system processes the feedback and appends the output of the processing to the dictionary formatted persona stored in the cloud.

In an embodiment, the KD-GAN output includes a confidence level associated with the annotations. The confidence level indicates a confidence that the generated annotations are representative of the input code and persona parameters. A feedback function feeds back a user's responses to provided annotations in order to further customize the GAN output over multiple iterations, if the confidence level is below a certain threshold. Based on response confirmation from the user, the method reinforces altered state and current constraints of the KD-GAN model. The method reinforces or fixes the current associated network node weightings as the current model generates or synthesizes user confirmed annotations for the provided code.

In an embodiment, the method receives credentials for a new user having no established persona data in the dictionary database. In this embodiment, scraped data yield no code or comment samples from which to build out the persona dictionary entry. The scraped data does provide role information in the form of a job title for the user. In this embodiment, the method utilizes persona data associated with the identified job title from other users as the starting point for altering the KD-GAN for the generation of tailored comments for the new user. The method then proceeds as outlined above, generating annotations of the user, receiving user feedback and updating the user's persona according to new scraped data and user feedback.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client device 104 and 110 represent user devices utilized to access the system code annotation functionalities by providing user credentials, sample code and comments feedback, code revisions. Client devices 104 and 110 comprise code annotation generation program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the code annotation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., code annotation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
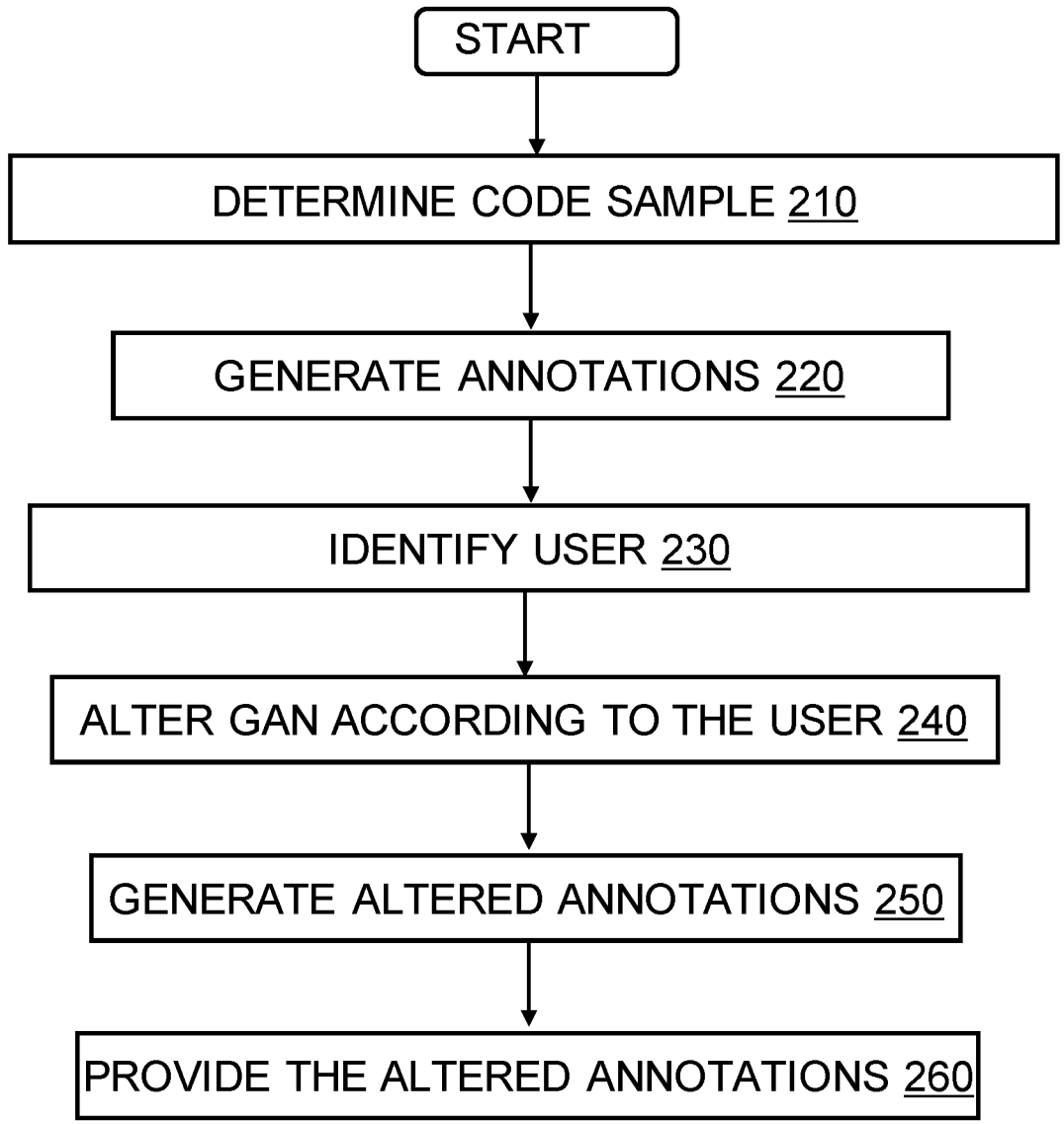
FIG. 2 provides a flowchart depicting an operational sequence, according to an embodiment of the invention.

FIG. 2 provides a flowchart 200, illustrating exemplary activities associated with the practice of the disclosure. After program start, at block 210, code annotation program 175 receives one or more code samples for annotation. A system user provides the code sample(s) to the system through a system input portal. The user accesses the system and provides their user identification and access credentials to the system prior to providing the code sample(s).

At block 220, the system generates generalized code annotations for the provided code using a generalized generative machine learning model such as a generative adversarial network (GAN). The model receives a representation of the code sample, such as a NLU representation of the code as input and generates annotations for the code.

At block 230, code annotation program 175 identifies the user according to the provided user identification and credentials. The method then retrieves any existing user persona data stored for example, in a cloud dictionary. The persona data includes user writing style data, user language paradigms, user language expertise data, etc. With the user's consent, the method scrapes available online data relating to the user and generates persona/profile data for new users or updates existing persona/profile data for existing users.

At block 240, the method alters the GAN using the persona/profile data for the user. The method constrains the GAN using the persona data as input parameters such that annotations generated for provided code sample are tailored according to the users writing style, language paradigms and expertise levels, etc.

At block 250, the method generates altered annotations for the provided code sample using the altered GAN. The altered annotations constitute annotations tailored according to the user's persona data.

At block 260, the method provides the altered annotations to the user in conjunction with the provided code sample. In an embodiment, the method receives feedback from the user regarding the altered annotations. The feedback includes revised code samples, annotation confirmations, altered annotations, or combinations of these. The method updates the user's persona according to the feedback, alters the generative model using the updated persona and alters the annotations using the updated generative model.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
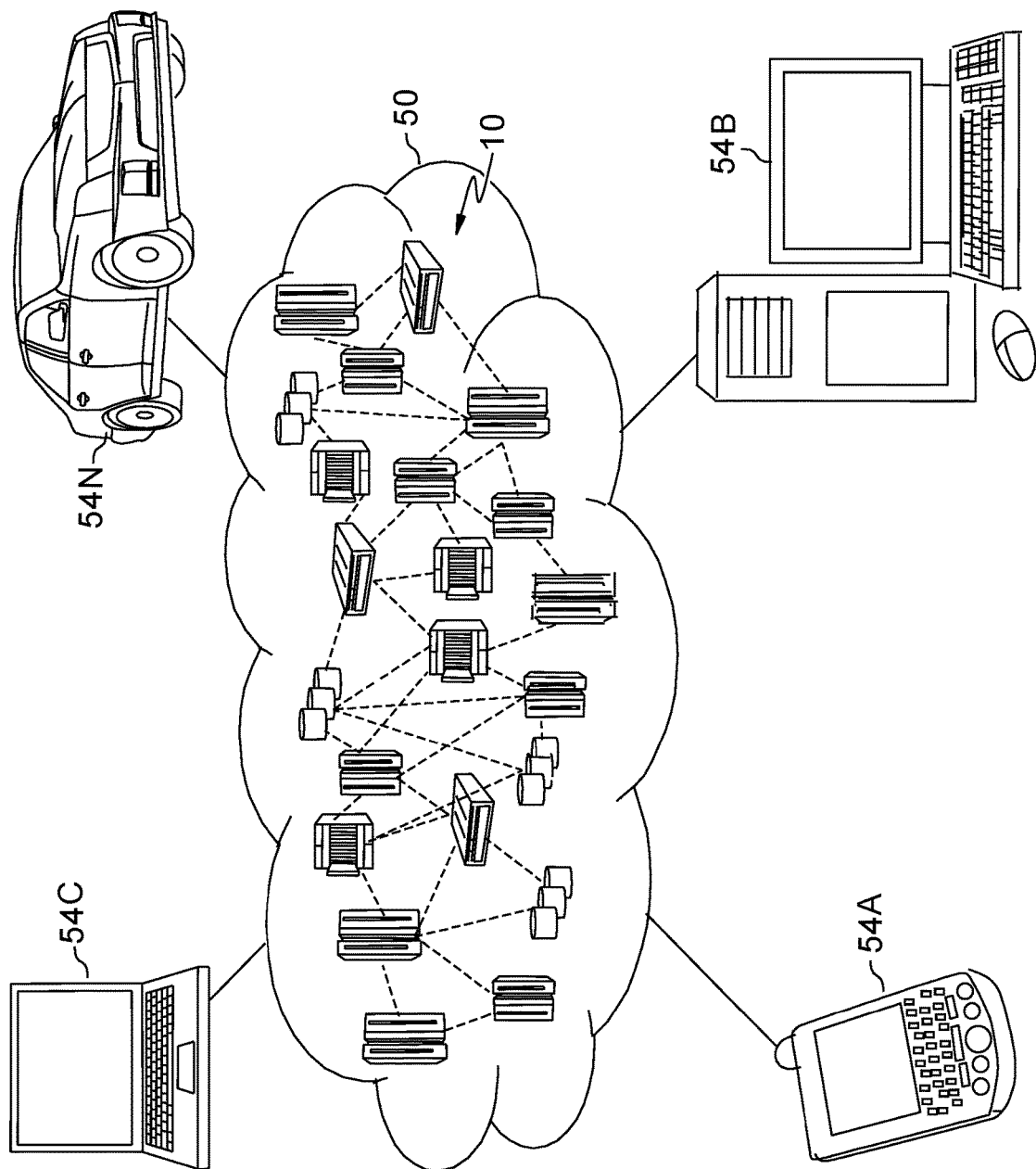
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
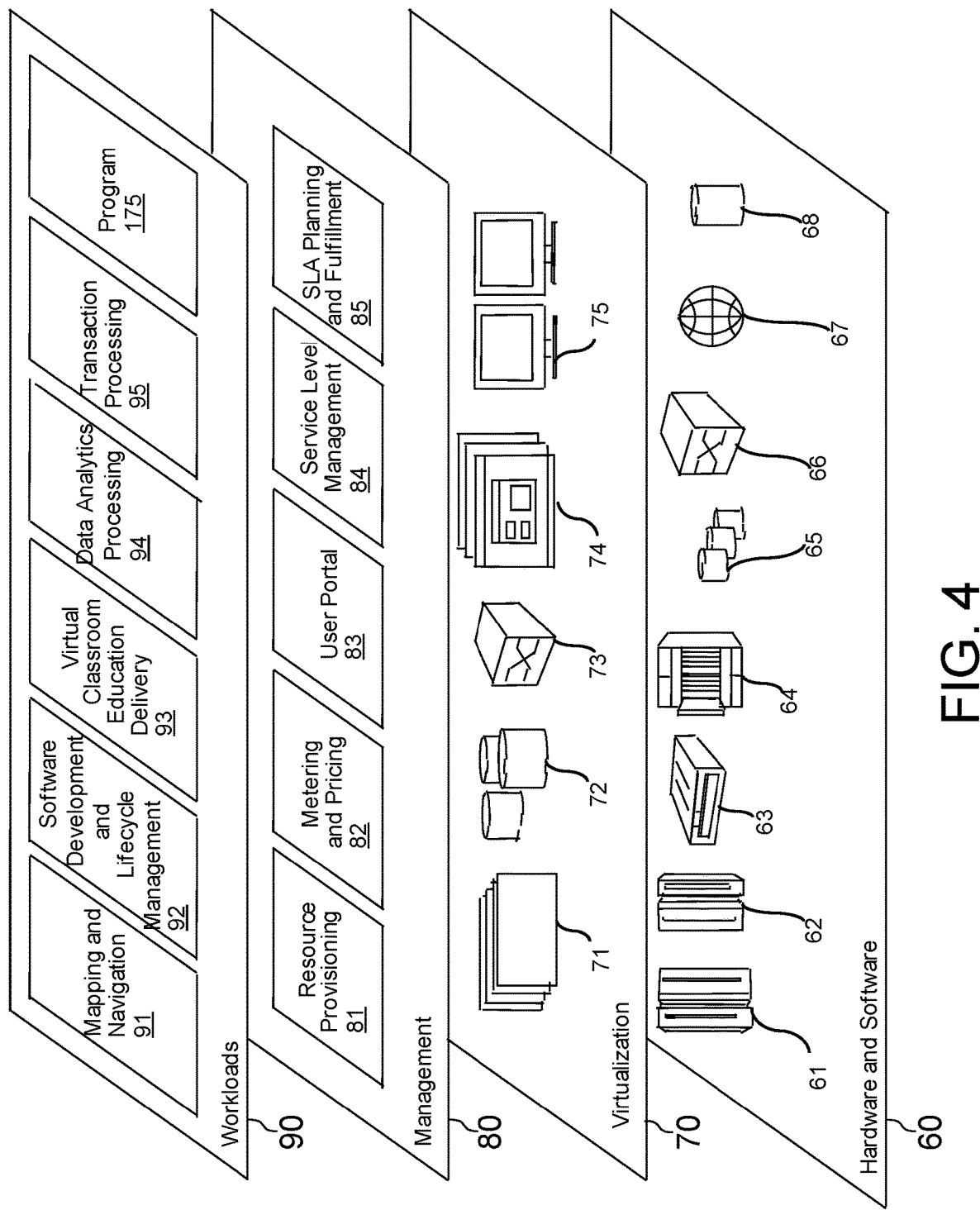
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code annotation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for annotating programming code, the method comprising:
   receiving, by one or more computer processors, a first version of programming code;
   generating, by the one or more computer processors, first annotations for the code according to a first machine learning model;
   identifying, by the one or more computer processors, a user:
   altering, by the one or more computer processors, the first machine learning model according to a persona of the user:
   generating, by the one or more computer processors, altered annotations using the altered machine learning model; and
   providing, by the one or more computer processors, the first version of the programming code and the altered annotations to the user.

2. The method according to claim 1, further comprising:
   receiving, by the one or more computer processors, a second version of the programming code, the second version revised according to the annotations; and
   generating, by the one or more computer processors, new annotations associated with the second version using the altered machine learning model.

3. The method according to claim 1, wherein the persona includes a user style of writing.

4. The method according to claim 1, further comprising determining, by the one or more computer processors, an entity associated with the user.

5. The method according to claim 4, further comprising adjusting, by the one or more computer processors, the persona according to the entity.

6. The method according to claim 1, wherein the persona relates to programming code submitted by the user.

7. The method according to claim 1, further comprising receiving, by the one or more computer processors, user feedback; and
   altering, by the one or more computer processors, the machine learning model according to the feedback.

8. A computer program product for annotating program code, the computer program product comprising one or more computer readable storage devices and collectively stored program instructions on the one or more computer readable storage devices, the stored program instructions comprising:
- program instructions to receive a first version of programming code;
- program instructions to generate annotations for the programming code according to a first machine learning model;
- program instructions to identify a user:
- program instructions to alter the machine learning model according to a persona of the user:
- program instructions to generate altered annotations using the altered machine learning model; and
- program instructions to provide the first version of the programming code and the altered annotations to the user.

9. The computer program product according to claim 8, the stored program instructions further comprising:
- program instructions to receive a second version of the programming code, the second version revised according to the annotations; and
- program instructions to generate new annotations associated with the second version using the altered machine learning model.

10. The computer program product according to claim 8, wherein the persona includes a user's style of writing.

11. The computer program product according to claim 8, the stored program instructions further comprising program instructions to determine an entity associated with the user.

12. The computer program product according to claim 11, the stored program instructions further comprising program instructions to adjust the persona according to the entity.

13. The computer program product according to claim 8, wherein the persona relates to programming code submitted by the user.

14. The computer program product according to claim 8, the stored program instructions further comprising program instructions to receive feedback from the user; and
- program instructions to alter the machine learning model according to the feedback.

15. A computer system for annotating programming code, the computer system comprising:
- one or more computer processors;
- one or more computer readable storage devices; and
- stored program instructions on the one or more computer readable storage devices for execution by the one or more computer processors, the stored program instructions comprising:
  - program instructions to receive a first version of programming code;
  - program instructions to generate annotations for the programming code according to a first machine learning model;
  - program instructions to identify a user:
  - program instructions to alter the machine learning model according to a persona of the user:
  - program instructions to generate altered annotations using the altered machine learning model; and
  - program instructions to provide the first version of the programming code and the altered annotations to the user.

16. The computer system according to claim 15, the stored program instructions further comprising:
- program instructions to receive a second version of the programming code, the second version revised according to the annotations; and
- program instructions to generate new annotations associated with the second version using the altered machine learning model.

17. The computer system according to claim 15, wherein the persona includes a user's style of writing.

18. The computer system according to claim 15, the stored program instructions further comprising program instructions to determine an entity associated with the user.

19. The computer system according to claim 18, the stored program instructions further comprising program instructions to adjust the persona according to the entity.

20. The computer system according to claim 15, the stored program instructions further comprising program instructions to receive feedback from the user; and
- program instructions to alter the machine learning model according to the feedback.

\* \* \* \* \*